(12) United States Patent
Liu et al.

(10) Patent No.: US 8,160,370 B2
(45) Date of Patent: Apr. 17, 2012

(54) IMAGE PROCESSING APPARATUS, IMAGE PROCESSING METHOD, AND PROGRAM

(75) Inventors: Yuyu Liu, Tokyo (JP); Keisuke Yamaoka, Tokyo (JP); Takayuki Yoshigahara, Tokyo (JP); Xi Chen, Zhejiang Province (CN)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 12/613,899

(22) Filed: Nov. 6, 2009

(65) Prior Publication Data

US 2010/0119162 A1    May 13, 2010

(30) Foreign Application Priority Data

Nov. 6, 2008  (JP) ................ P2008-285531

(51) Int. Cl.
  *G06K 9/68*   (2006.01)
  *H04N 5/225*  (2006.01)
  *G10L 15/00*  (2006.01)
(52) U.S. Cl. ............ 382/220; 348/169; 704/239
(58) Field of Classification Search .......... 382/100, 382/103, 220, 236, 240; 348/94, 152, 154, 348/155, 169; 707/736, 737, 796, 806, 631, 707/778, 786, 829, 956; 725/259, 273, 961; 704/239; 715/853
See application file for complete search history.

(56) References Cited

U.S. PATENT DOCUMENTS

| | | | |
|---|---|---|---|
| 6,385,245 B1 * | 5/2002 | De Haan et al. | 375/240.16 |
| 6,741,757 B1 * | 5/2004 | Torr et al. | 382/294 |
| 7,382,897 B2 * | 6/2008 | Brown et al. | 382/103 |
| 7,502,528 B2 * | 3/2009 | Mishima et al. | 382/294 |

FOREIGN PATENT DOCUMENTS

| | | |
|---|---|---|
| JP | 2001-134750 | 5/2001 |
| JP | 2004-295775 | 10/2004 |
| JP | 2007-328746 | 12/2007 |
| JP | 2008-026974 | 2/2008 |

OTHER PUBLICATIONS

Adelson, E. et al., "Pyramid methods in image processing", RCA Engineer, pp. 33-41, Nov. 1984.

* cited by examiner

*Primary Examiner* — Abolfazl Tabatabai

(74) *Attorney, Agent, or Firm* — Finnegan, Henderson, Farabow, Garrett & Dunner, L.L.P.

(57) ABSTRACT

An image processing apparatus includes: an image pyramid forming section configured to form an image pyramid by hierarchically creating layered image data including differently scaled images from inputted image data; a position calculating section configured to determine an in-image-pyramid position as a height position in the image pyramid to which template image data having an image portion of a target object at a fixed scale corresponds; an upper-layer-side likelihood calculating section configured to determine a likelihood for a target object by matching between upper-side layer image data directly above the in-image-pyramid position, and a state prediction; a lower-layer-side likelihood calculating section configured to determine a likelihood for a target object by matching between lower-side layer image data directly below the in-image-pyramid position, and a state prediction; and a true likelihood calculating section configured to determine a true likelihood from the likelihoods determined by the upper-layer-side and lower-layer-side likelihood calculating sections.

6 Claims, 7 Drawing Sheets

HEAD IMAGE AREA

IMAGE PROCESSING APPARATUS, IMAGE PROCESSING METHOD, AND PROGRAM

BACKGROUND OF THE INVENTION

1. Field of the Invention

The present invention relates specifically to an image processing apparatus and an image processing method which use a pyramid image. The present invention also relates to a program executed by such an image processing apparatus.

2. Description of the Related Art

As described in E. Andelson, et al., "Pyramid methods in image processing", RCA Engineer, 29(6):22-41, in the related art, an image pyramid is used in image processing.

When actually shooting an image to obtain a shot image of an object to be processed, as the shooting distance between the object and an image shooting apparatus changes, the scale of the object on the image changes, which may present a problem depending on the kind of image processing.

Accordingly, when images hierarchically arranged by scale are used by employing an image pyramid technique, image processing can be performed irrespective of the variations in the scale of an object on an image mentioned above.

SUMMARY OF THE INVENTION

It is desirable to provide enhanced efficiency and higher throughput than in the related art with regard to use of an image pyramid when performing, for example, object detection or tracking with respect to a preset target object as image processing using the image pyramid.

According to an embodiment of the present invention, there is provided an image processing apparatus including: image pyramid forming means for forming an image pyramid by creating layered image data including images at different scales in a hierarchical arrangement from inputted image data; position calculating means for determining an in-image-pyramid position that is a height position in the image pyramid to which template image data corresponds, the template image data having an image portion of a target object at a fixed scale; upper-layer-side likelihood calculating means for determining a likelihood with respect to a target object by matching between upper-side layer image data that exists directly above the in-image-pyramid position, and a state prediction; lower-layer-side likelihood calculating means for determining a likelihood with respect to a target object by matching between lower-side layer image data that exists directly below the in-image-pyramid position, and a state prediction; and true likelihood calculating means for determining a true likelihood from the likelihoods determined by the upper-layer-side likelihood calculating means and the lower-layer-side likelihood calculating means.

According to the above-mentioned configuration, an image pyramid including a plurality of pieces of layered image data at different scales is formed on the basis of inputted image data, a template having a fixed scale is prepared with respect to a target object is prepared, and an in-image-pyramid position (height position in the image pyramid) to which the template corresponds is determined. Then, for each of upper-side layer image data and lower-side layer image data that are identified on the basis of this in-image-pyramid position, a likelihood is determined by matching against a state prediction. The likelihoods respectively calculated in accordance with the upper-side layer image data and the lower-side layer image data mentioned above are approximations obtained in correspondence with a scale larger than and a scale smaller than the true scale of the target object, respectively. Accordingly, a true likelihood is determined by using these likelihoods. That is, according to an embodiment of the present invention, a likelihood can be determined with higher accuracy at a resolution higher than the resolution that is determined in accordance with the number of pieces of layered image data forming the image pyramid.

DESCRIPTION OF THE PREFERRED EMBODIMENTS

As the best mode for carrying out the present invention (hereinafter, referred to as embodiment), a description will be given of a case in which a configuration based on an embodiment of the present invention is applied to a tracking system that executes tracking of a specific part.

The description below will be given in the following order of topics.

<1. Image Pyramid>
<2. Tracking System Configuration Example>
<3. Head Tracking System Configuration Example>
<4. Configuration Example of Computer Apparatus>

<1. Image Pyramid>

First, referring to FIGS. 1 and 2, a description will be given of an image pyramid used in a tracking system according to this embodiment.

Figure 1:
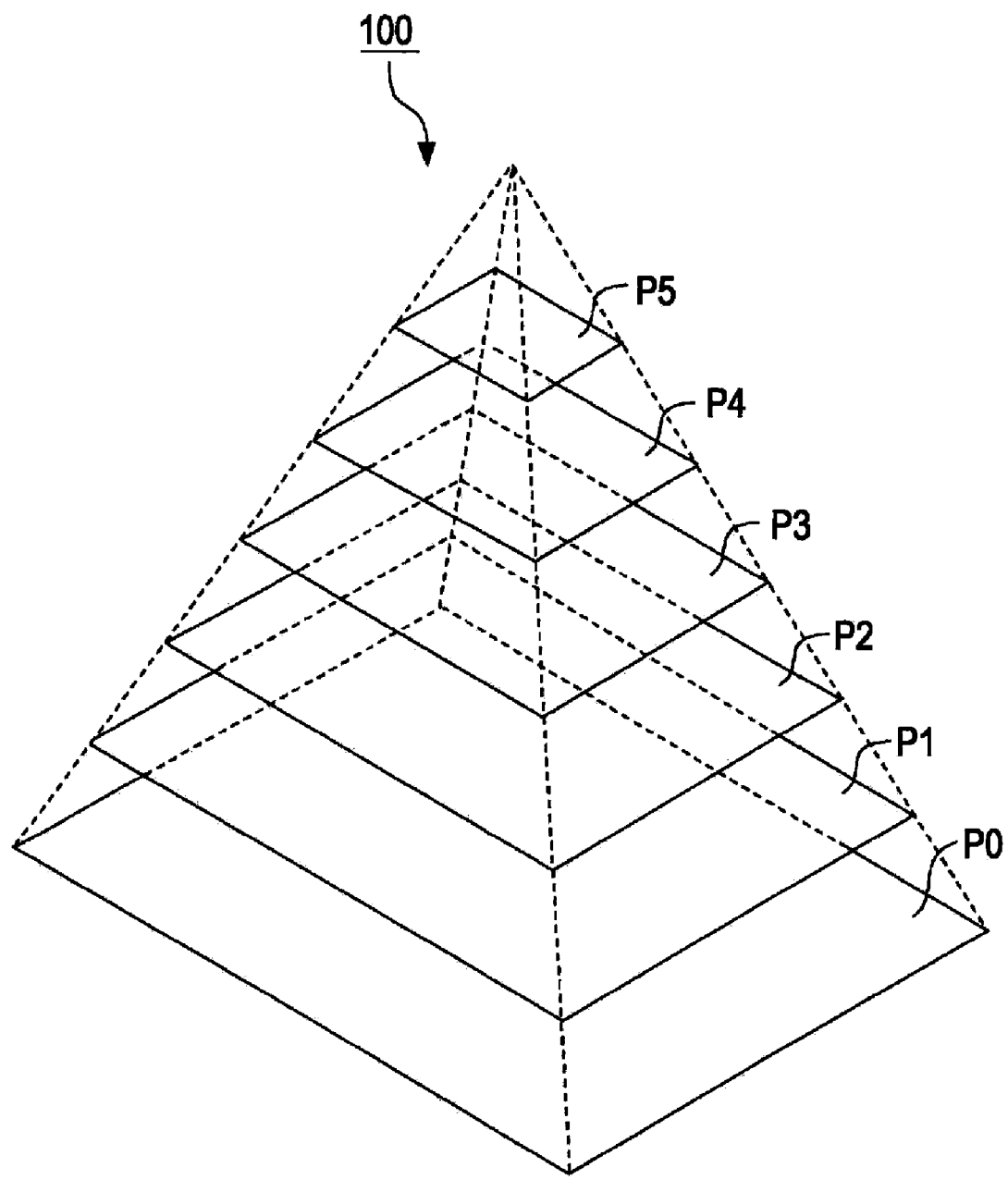
FIG. 1 is a schematic diagram illustrating the concept of an image pyramid.

FIG. 1 shows six images including a zeroth layer image P0, a first layer image P1, a second layer image P2, a third layer image P3, a fourth layer image P4, and a fifth layer image P5.

The zeroth to fifth layer images P0 to P5 have the same image content but have different scales (sizes/resolutions).

In this case, among the zeroth to fifth layer images P0 to P5, the largest scaled image is the zeroth layer image P0. Thereafter, the image scale decreases progressively in the order of the first layer image P1, the second layer image P2, the third layer image P3, the fourth layer image P4, and the fifth layer image P5.

Figure 2:
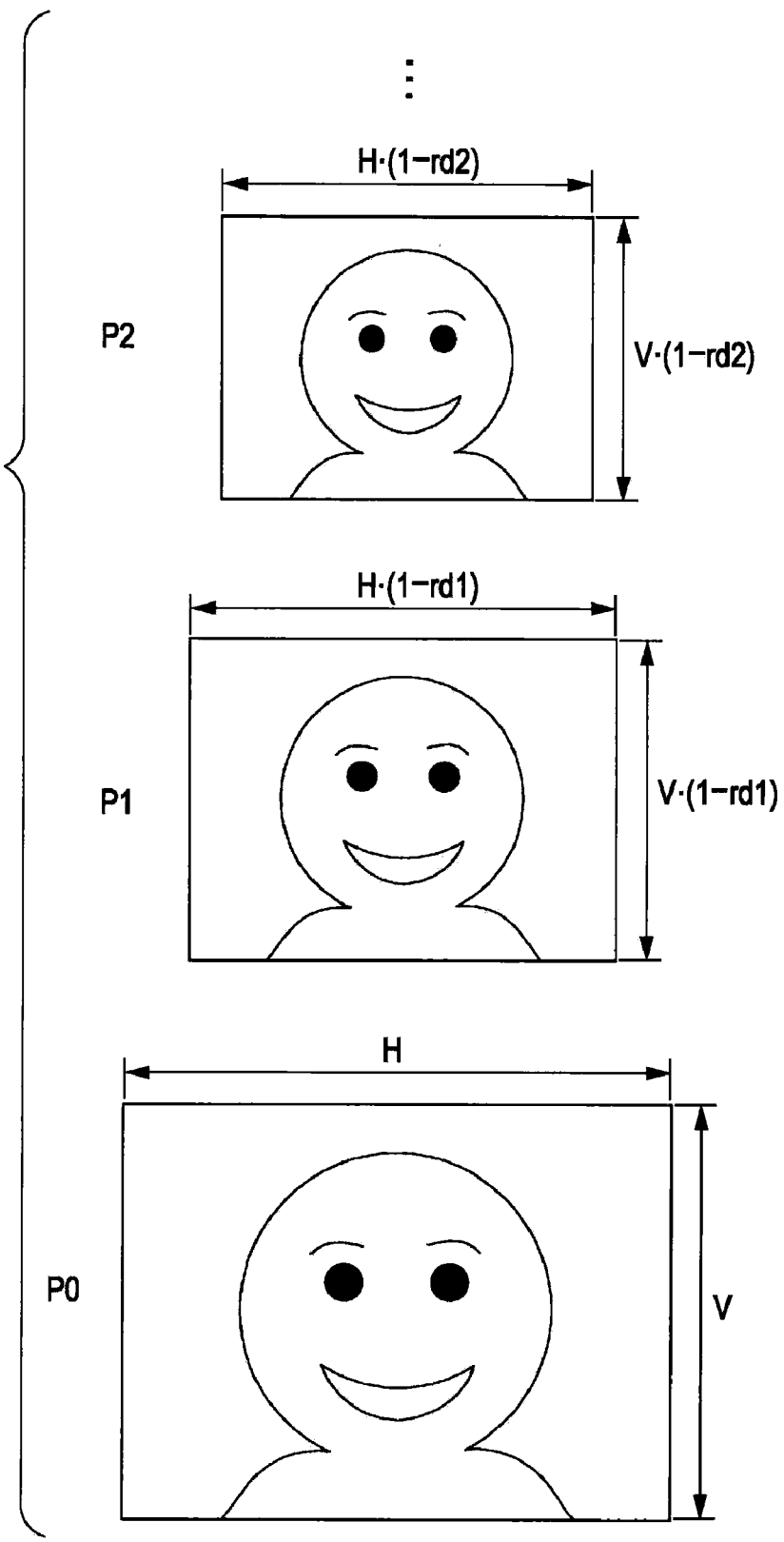
FIG. 2 is a diagram illustrating layer images forming an image pyramid.

In FIG. 2, the zeroth layer image P0, the first layer image P1, and the second layer image P2 in FIG. 1 are picked out and shown. Supposing that the number of horizontal×vertical pixels in the zeroth layer image P0=H×V, the first layer image P1 is an image at a scale represented by the number of horizontal×vertical pixels=$H \cdot (1-rd1) \times V \cdot (1-rd1)$, which is obtained by reducing the zeroth layer image P0 at a predetermined reduction ratio rd1 (rd1<1) that is set in advance. The second layer image P2 is an image at a scale represented by the number of horizontal×vertical pixels=$H \cdot (1-rd2) \times V \cdot (1-rd2)$, which is obtained by reducing the zeroth layer image P0 at a predetermined reduction ratio rd2 that is set in advance and larger than the reduction ratio rd1.

In this way, the scale decreases progressively in the order of the zeroth layer image P0 to the fifth layer image P5. Now, suppose that these layer images are stacked upwards in order so as to be arranged hierarchically with the zeroth layer image P0 as the lowermost layer. Then, it can be regarded that a square cone, that is, a pyramid shape is formed as shown in FIG. 1 by faces that are in contact with the outer edges of those layer images. A pyramid shape formed by stacking up layer images in a hierarchical arrangement in this way is herein referred to as image pyramid 100. In the image pyramid 100 formed in this way, the scale of an image having the same single image content varies with the height position in the pyramid. The image scale becomes smaller as the position in the image pyramid 100 becomes higher.

In this embodiment, the zeroth layer image serves as the base in forming the image pyramid 100 mentioned above. That is, inputted frame image data (original frame image data) serves as the zeroth layer image. Then, for example, images obtained by reducing the original frame image data at different predetermined reduction ratios respectively serve as the first to fifth layer images P1 to P5.

While in this example layer images forming the image pyramid 100 are six images from the zeroth to fifth layer images P0 to P5, this is merely one example. That is, the number of levels of images forming the image pyramid 100 should not be particularly limited as long as it is two or more, and may be set in accordance with the scale of input image data (original frame image data) actually supported by the system, the throughput of hardware or software included in the system, the necessary tracking performance, and the like.

<2. Tracking System Configuration Example>

Figure 3:
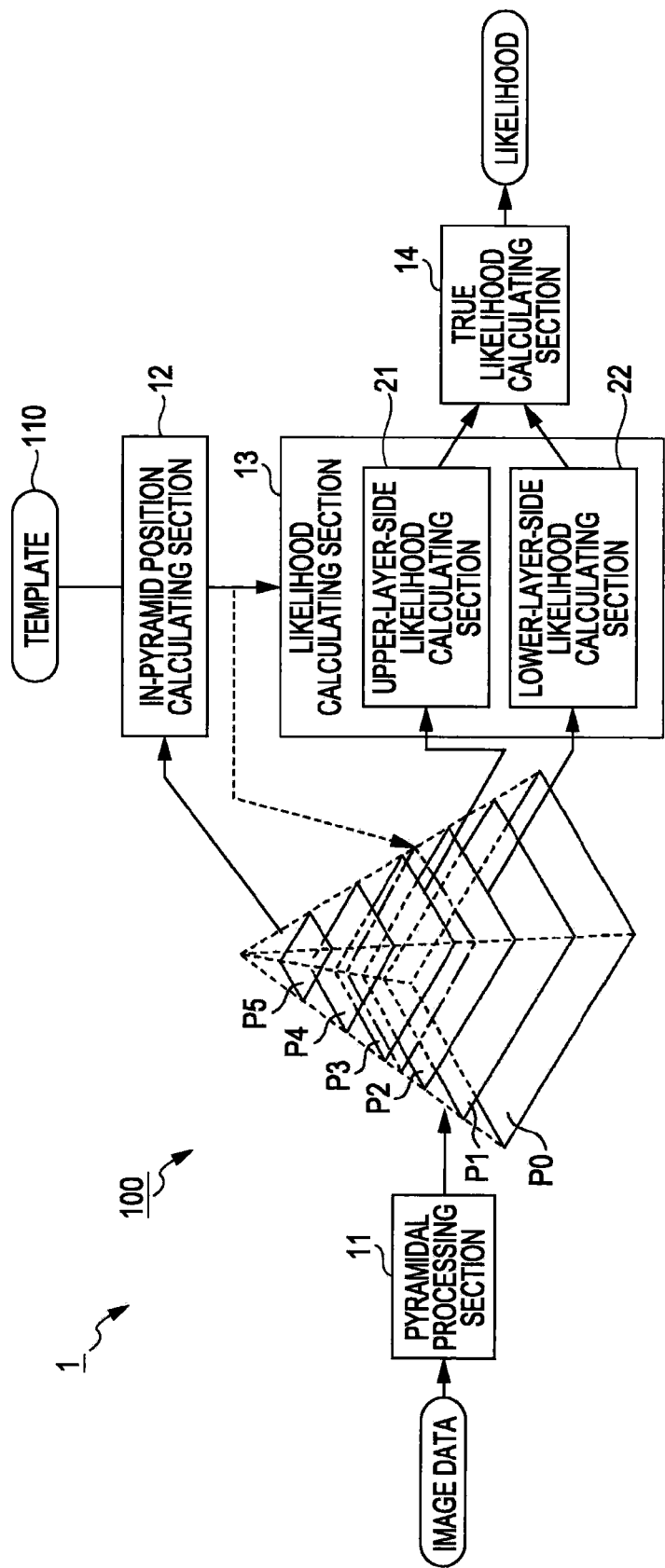
FIG. 3 is a diagram showing a basic configuration example of a tracking system according to this embodiment.

FIG. 3 is a configuration example of a tracking system 1 according to this embodiment. This tracking system is configured to receive an input of image data as a moving image, and track a specific object (target object) that is set as a tracking target, on the basis of this image data.

In the tracking system 1 shown in this figure, image data as a moving image is inputted by a pyramidal processing section 11. The image data of a moving image inputted by the tracking system 1 (pyramidal processing section 11) can be obtained by, for example, image shooting executed in real time.

The pyramidal processing section 11 sequentially captures inputted image data in units of frame images. Then, with respect to the captured frame images, a predetermined number of pieces of layered image data are created as illustrated in FIGS. 1 and 2. That is, an image pyramid is created. At this time, with the captured frame image data as the zeroth layer image, the pyramidal processing section 11 creates a necessary number of layer images at predetermined scales smaller than that of the data of the zeroth layer image.

In FIG. 3, as in FIG. 1, an image pyramid formed by six layers from the zeroth to fifth layer images P0 to P5 is illustrated as the image pyramid 100 formed by the pyramidal processing section 11. However, as described above, this is merely one example. The number of layers actually formed should be determined as appropriate by taking the above-described conditions and the like into consideration.

A template 110 shown in FIG. 3 is the image data having as its image content an object (target object) that is set as a tracking target with respect to the tracking system 1. In the template 110, the image portion of a target object exists within an image (frame) at a specified scale that is set in advance. Therefore, the target object shown in the template also has a given fixed scale.

On the other hand, image data (input image data) inputted to the tracking system 1 (pyramidal processing section 11) is image data obtained by, for example, real-time image shooting. Therefore, depending on the actual movement of the target object being shot, the shooting distance to the target object can vary with the elapse of time.

This means that there is no guarantee that the scale of a target object in the input image data is the same as the scale of the target object in the template.

It is extremely difficult to determine the position of a target object (likelihood) at the current time with high accuracy through a match between such differently scaled images of a target object. In other words, to determine the likelihood with high accuracy, it is necessary to make the scales of the target object the same between the template and the input image data.

To this end, in this embodiment, input image data is formed as the image pyramid 100 by the pyramidal processing section 11. Thereafter, a layer image closest to the scale of the target object in the template is identified from among the layer images forming the image pyramid 100. Then, this identified layer image and the image in the template are matched against each other to determine the likelihood with respect to the position of the target object.

A position calculating section 12 determines the height position (in-pyramid height) to which the scale of the target object in the template 110 corresponds, supposing that the template 110 is applied to the image pyramid 100 formed by the pyramidal processing section 11.

In this regard, when seen at each individual layer image level, it appears that the image pyramid 100 is formed discretely in accordance with the number of its layer images, that is, has stepped heights based on resolutions corresponding to layer images.

However, the in-pyramid position calculating section 12 regards the height of the image pyramid 100 as being continuous, and calculates the in-pyramid position within this continuous height. It should be noted, however, that since this is digital processing in actuality, strictly speaking, calculated in-pyramid positions are discrete and have finite resolutions. However, the resolutions of in-pyramid positions are far higher than the resolutions corresponding to layer images, and can be regarded as continuous in this respect.

In this regard, the scale of the target object in the image as the template 110 is known. In addition, since the zeroth layer image P0 in the image pyramid 100 is input image data, the scale of the target object in the image of this input image data can be easily detected. In addition, if the scale of the zeroth layer image P0 is known, the scales of the target object in layer images at higher levels than this layer image are also known. This means that at the time the image pyramid 100 is formed, the correspondence between the height in the image pyramid and the scale of the target object is also known. Therefore, the in-pyramid position calculating section 12 can determine an in-pyramid position by, for example, determining the ratio between the scale of the target object in the template 100 and the scale of the target object in the zeroth layer image P0. As can be appreciated from the foregoing description, the in-pyramid position determined in this way can indicate a given height between a given one layer image and a layer image at the next higher level. FIG. 3 shows an example in which an in-pyramid position is determined between the second layer image P2 and the third layer image P3 as indicated by the alternate long and short dashed line.

Information on the in-pyramid position determined by the in-pyramid position calculating section 12 is passed to a likelihood calculating section 13.

The likelihood calculating section 13 first identifies each of an upper-side layer image and a lower-side layer image that sandwich the in-pyramid position that has been passed. In the case of FIG. 3, since the in-pyramid position is determined as being located between the second layer image P2 and the third layer image P3, the third layer image P3 is identified as the upper-side layer image, and the second layer image P2 is identified as the lower-side layer image.

It is also possible to identify the upper-side layer image and the lower-side layer image by the in-pyramid position calculating section 12, and pass information that can indicate to which layer image each of the upper-side layer image and the lower-side layer image corresponds, to the likelihood calculating section 13 from the in-pyramid position calculating section 12.

The likelihood calculating section 13 includes two likelihood calculating sections, an upper-layer-side likelihood calculating section 21 and a lower-layer-side likelihood calculating section 22. These likelihood calculating sections are formed as particle filters, for example. The upper-layer-side likelihood calculating section 21 performs matching between the upper-side layer image as an observation and each created particle to thereby determine a likelihood on a particle-by-particle basis. Likewise, the lower-layer-side likelihood calculating section 22 performs matching between the lower-side layer image as an observation with each created particle to thereby determine a likelihood on a particle-by-particle basis.

That is, in this embodiment, likelihoods are determined for each of two observations that are the layer images located directly above and directly below an in-pyramid position to which the scale of the target object in the template 110 corresponds, among layer images forming the image pyramid 100. In this regard, the above-mentioned layer image located directly above is the layer image in which the target object is present at a scale closest to that in the template 110, among layer images in which the target object is present at scales smaller than that in the template 110. The above-mentioned layer image located directly below is the layer image in which the target object is present at a scale closest to that in the template 110, among layer images in which the target object is present at scales larger than that in the template 110. The upper-layer-side likelihood calculating section 21 and the lower-layer-side likelihood calculating section 22 each determine individual likelihoods on a particle-by-particle basis, and finally determine a likelihood as the maximum likelihood estimate on the basis of these individual likelihoods.

As can be appreciated from the above description, with the scale of a target object in the template 110 as a reference, the likelihood determined by each of the upper-layer-side likelihood calculating section 21 and the lower-layer-side likelihood calculating section 22 is an approximation with the smallest error among approximations that can be determined through matching against the target object at smaller scales, or an approximation with the smallest error among approximations that can be determined through matching against the target object at larger scales. This means that the true likelihood that coincides with the scale of the target object in the template 110 exists between the two approximations mentioned above.

Accordingly, the true likelihood calculating section 14 executes processing for determining a likelihood (true likelihood) that can be handled as the above-mentioned true likelihood, by processing using the likelihood (upper-layer-side likelihood) determined by the upper-layer-side calculating section 21 and the likelihood (lower-layer-side likelihood) determined by the lower-layer-side likelihood calculating section 22.

In this regard, a true likelihood can be determined by the true likelihood calculating section 14 by, for example, performing processing equivalent to interpolation with respect to a value as the above-mentioned upper-layer-side likelihood and a value as the lower-layer-side likelihood. A specific example of an algorithm executed by the true likelihood calculating section 14 to determine the true likelihood will be described later.

For example, in cases where the image pyramid is not adopted, with respect to variations in the scale or the like of a target object in input image data as an observation, it is necessary to make the scale or the like of the target object in the image of the template coincide with that in the input image. For this reason, it is necessary to perform a process of changing the scale of the image in the template (and the center position, rotation angle, and the like of the target object) so as to adapt to the variations in the scale of the target object in the input image data. However, the computation for achieving such a process is very heavy.

Accordingly, the image pyramid technique is adopted as in this embodiment. Thus, the template 110 used may be fixed. Then, in the manner as described above, a selected layer image and the template 110 are matched against each other, thereby making it possible to attain the same effect as performing a match after varying the scale of the image in the template 110 in accordance with the scale of input image data.

A common technique for calculating a likelihood using an image pyramid is to, for example, select a single layer image that is present at the closest position to a determined in-pyramid position, and perform a matching process by using the selected layer image.

However, it is not practical to make the number of layer images (the number of levels) forming the image pyramid unduly large. Rather, the number is limited to an appropriate number by taking the weight of pyramidal processing or the like into consideration. For this reason, with the above-mentioned common technique, the calculated likelihood can reflect only up to discrete scales based on the number of layer images. That is, the calculated likelihood can only take an approximation based on the layer image closest to the scale of the target object in the template 110, under the constraint of coarse resolution based on the number of layer images.

It is possible to make this approximation as close to the true likelihood as possible by increasing the number of layer images forming the image pyramid. However, as mentioned above, increasing the number of levels makes the pyramidal processing or the like that much heavier, making it no longer possible to attain the benefit of reduced processing load through the adoption of the image pyramid.

Accordingly, in this embodiment, two layer images including an upper-side layer image and a lower-side layer image sandwiching a determined in-pyramid position are selected, and on the basis of likelihoods individually determined for these layer images, a true likelihood is determined by, for example, an interpolation process.

Thus, in this embodiment, it is possible to obtain a likelihood (true likelihood) with an accuracy equivalent to that obtained by performing a match against input image data at the same scale of the target image as that in the template 110, while keeping the number of layer images forming the image pyramid to a certain number or less.

As described above, the upper-layer-side likelihood calculating section 21 and the lower-layer-side likelihood calculating section 22 in the likelihood calculating section 13 determine likelihoods by performing matching between particles and layer images. A plurality of measures (matching measures) can be adopted at this time.

A configuration conceivable as the most basic configuration of the upper-layer-side likelihood calculating section 21 and the lower-layer-side likelihood calculating section 22 in this embodiment is to, for example, select a single measure that is optimum in accordance with the actual target object or the like, from among a plurality of measures, and apply this selected measure to the upper-layer-side likelihood calculating section 21 and the lower-layer-side likelihood calculating section 22.

However, the present inventors have confirmed that an improved performance in terms of robustness, for example, can be achieved by determining likelihoods by a plurality of measures and then integrating these likelihoods, rather than determining a likelihood by a single measure.

Figure 4:
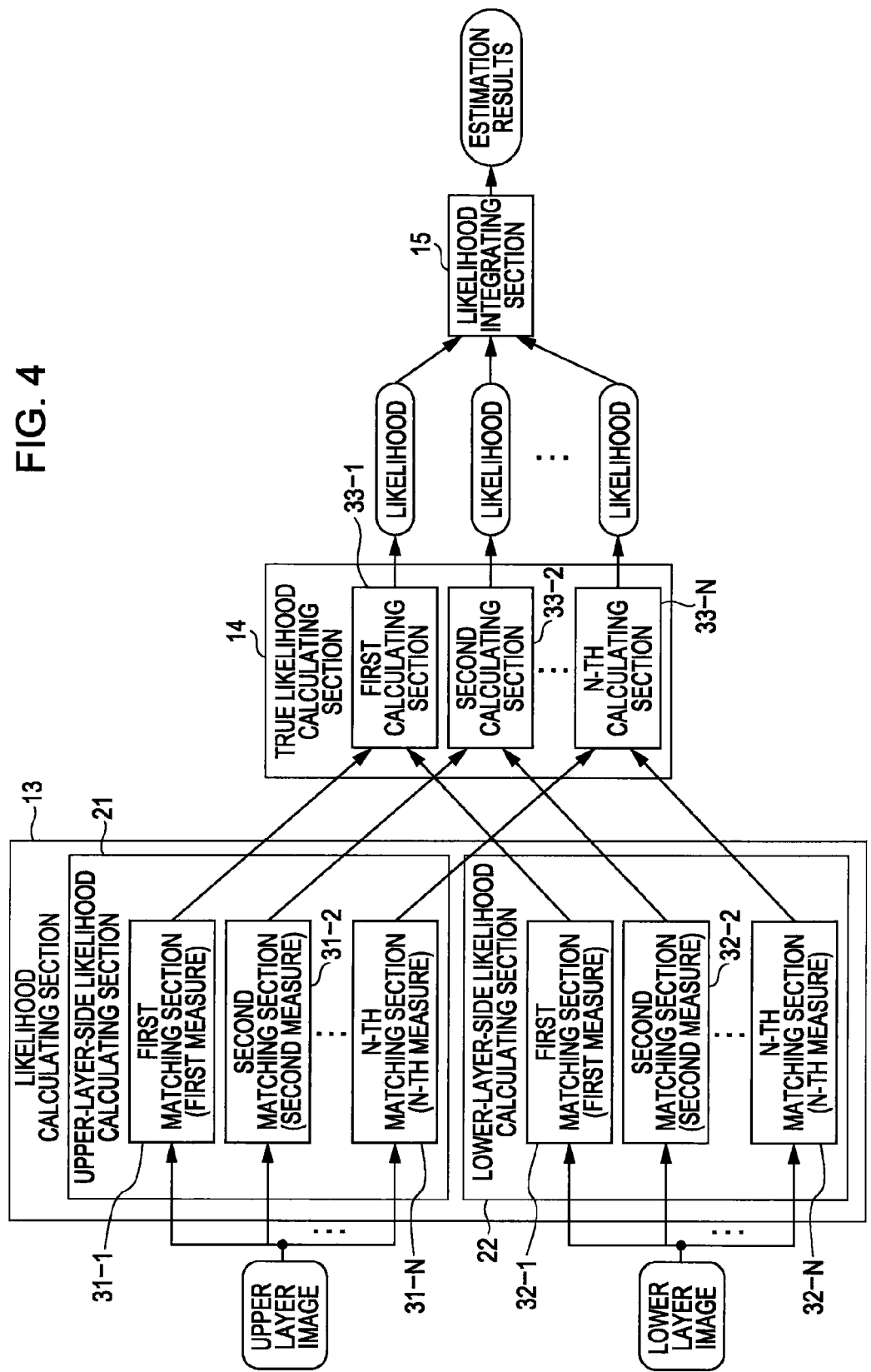
FIG. 4 is a diagram showing a configuration example in the case where a plurality of measures are adopted in the tracking system according to this embodiment.

Accordingly, this embodiment can take a configuration in which a plurality of measures are applied to each of the upper layer side and the lower layer side of a layer image. A configuration example of a tracking system to which these plurality of measures are applied is shown in FIG. 4. It should be noted that the pyramidal processing section 11 and the in-pyramid position calculating section 12 are not particularly changed in configuration irrespective of whether a single or plurality of measures are applied. For this reason, in FIG. 4, the pyramidal processing section 11 and the in-pyramid position calculating section 12 are not shown.

In FIG. 4, first, the upper-layer-side likelihood calculating section 21 includes N matching sections from a first matching section 31-1 to an N-th matching section 31-N. Different measures are applied individually to the first to N-th matching sections 31-1 to 31-N. The measures applied individually to the first to N-th matching sections 31-1 to 31-N are herein referred to as first to N-th measures.

The first matching section 31-1 captures an upper-side layer image as an observation corresponding to the first measure, and performs matching against each particle to obtain a likelihood. Likewise, the second to N-th matching sections 31-2 to 31-N each capture an upper-side layer image as an observation corresponding to each of the second to N-th measures, respectively, and performs matching against each particle to obtain a likelihood.

The lower-layer-side likelihood calculating section 22 also includes the same number of matching sections as the upper-layer-side likelihood calculating section 21, that is, N matching sections from a first matching section 32-1 to an N-th matching section 32-N. Then, first to N-th measures that are different from each other are similarly applied to the first to N-th matching sections 32-1 to 32-N. Thus, the first to N-th matching sections 32-1 to 32-N each handle a lower-side layer image as an observation corresponding to each of the first to N-th measures, respectively, and perform a matching process against each particle to calculate a likelihood.

As mentioned above, the measure applied to the first matching section 31-1 in the upper-layer-side likelihood calculating section 21 is the same as the measure applied to the first matching section 32-1 in the upper-layer-side likelihood calculating section 21. Likewise, the measures individually applied to the second to N-th matching sections 31-1 to 31-N in the upper-layer-side likelihood calculating section 21 are the same as the measures individually applied to the second to N-th matching sections 32-1 to 32-N in the lower-layer-side likelihood calculating section 22, respectively.

According to the configuration of the likelihood calculating section 13 mentioned above, N likelihoods determined individually by the first to N-th matching sections 31-1 to 31-N (the first to N-th measures) are outputted from the upper-layer-side likelihood calculating section 21. Likewise, N likelihoods determined individually by the first to N-th matching sections 32-1 to 32-N (the first to N-th measures) are outputted from the lower-layer-side likelihood calculating section 22.

In accordance with the number of matching sections (measures), the true likelihood calculating section 14 in this case similarly includes N calculating sections from first to N-th calculating sections 33-1 to 33-N.

The first calculating section 33-1 performs a process equivalent to interpolation, for example, with respect to likelihoods that are obtained on the basis of the same common first measure, that is, the likelihoods outputted from the first matching section 31-1 of the upper-layer-side likelihood calculating section 21 and the first matching section 32-1 of the lower-layer-side likelihood calculating section 22, thereby determining a true likelihood based on the first measure.

Likewise, the remaining second to N-th calculating sections 33-2 to 33-N respectively determine true likelihoods based on the second to N-th measures by interpolation processes using likelihoods that are obtained on the basis of the same common second to N-th measures (likelihoods outputted from the second to N-th matching sections 31-2 to 31-N of the upper-layer-side likelihood calculating section 21, and the second to N-th matching sections 32-2 to 32-N of the lower-layer-side likelihood calculating section 22).

In this case, N true likelihoods individually determined for the first to N-th measures are outputted. Accordingly, in the configuration shown in FIG. 4, these plurality of likelihoods are integrated by a likelihood integrating section 15 to output a final estimate (estimation result).

Several algorithms are conceivable as specific examples of algorithm as a likelihood integration process executed by the likelihood integrating section 15, and no particular limitation should be placed here. For example, in the simplest conceivable example, the largest of a plurality of captured likelihoods is outputted as the integrated likelihood. In another conceivable example, weighting coefficients are set individually for the first to N-th measures, the weighted mean is determined with respect to a plurality of captured likelihoods, and this is outputted as the integrated likelihood.

<3. Head Tracking System Configuration Example>

Subsequently, a description will be given of a specific configuration example in the case where the tracking system according to this embodiment described above with reference to FIGS. 3 and 4 is applied to tracking of a human head.

Figure 6:
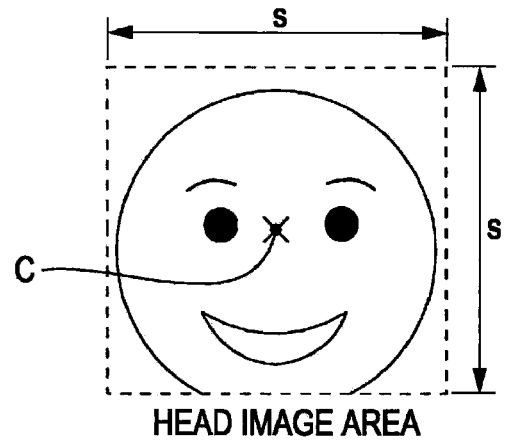
FIG. 6 is a diagram schematically showing a head image area defined under a head tracking system.

To perform head tracking according to this embodiment, first, as shown in FIG. 6, a quadrate image portion including the image of a human head is defined as a head image area.

The head image area in this case is a square-shaped image region with a horizontal scale=vertical scale=s. An Ω-shape as a human head fits in this image region at a fixed ratio. In addition, in the head image area, its center position C is defined. The center position C in this case is, for example, the intersection point of the diagonals of the square-shaped head image area. The head tracking system according to this embodiment tracks the head as an Ω-shape that is present in the head image area in this way.

Next, as a plurality of measures to be applied to the likelihood calculating section 13 to track the above-mentioned human head as an Ω-shape, the following four measures from first to fourth measures are selected.

First Measure: "Chamfer distance to the contour of a masked head image"

Second Measure: "Proportion of masked pixels inside the head's Ω-shape"

Third Measure: "Proportion of masked pixels outside the head's Ω-shape"

Fourth Measure: "Chamfer distance to the edge of the head's Ω-shape"

The prevent inventors have confirmed as a result of examination that applying the above-mentioned four measures can provide high robustness for a human head tracking process.

Figure 5:
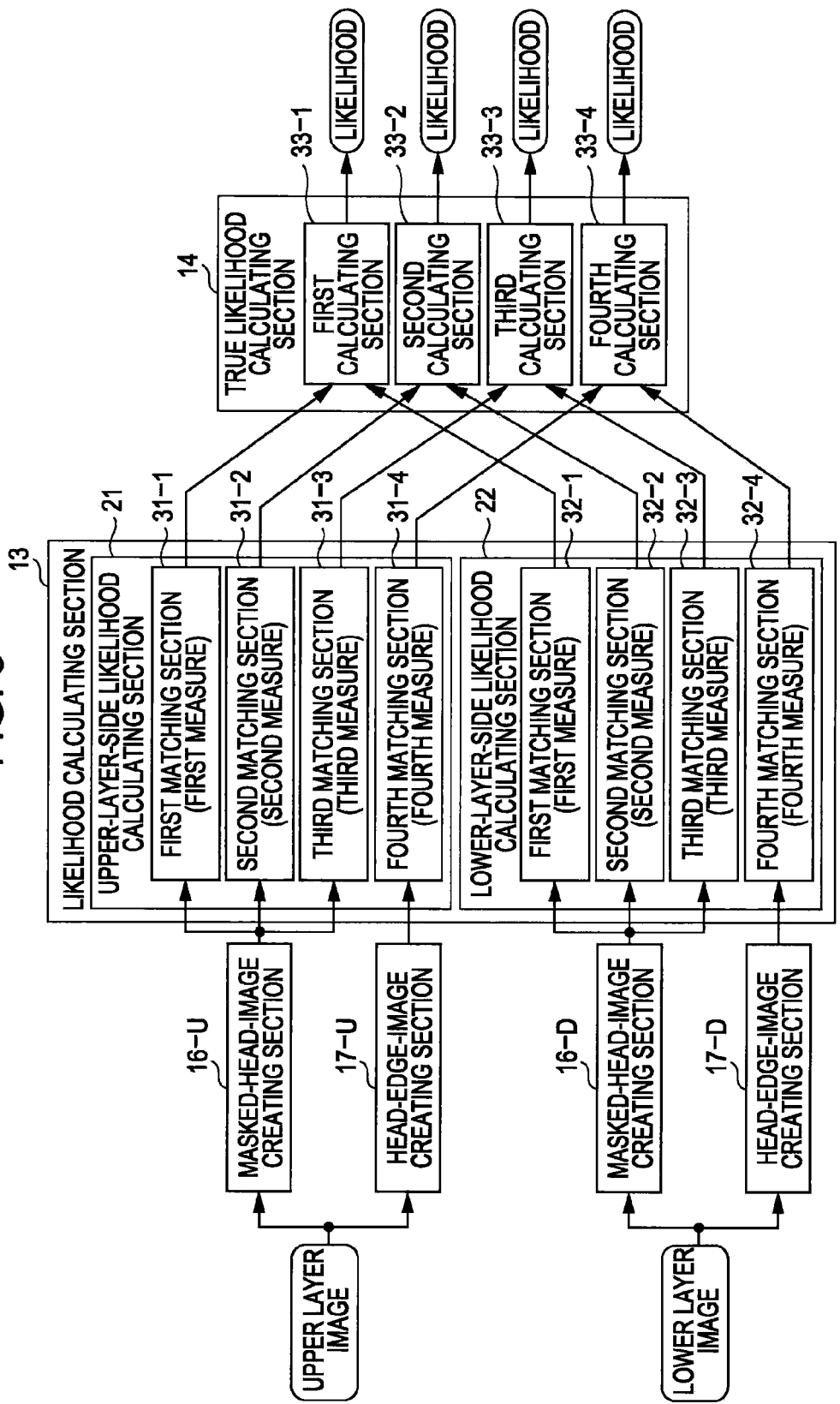
FIG. 5 is a diagram showing a configuration example of the tracking system according to this embodiment adapted to a human head tracking process.

FIG. 5 shows a configuration example of a human head tracking system adopting the above-mentioned first to fourth measures.

In this figure, as the human head tracking system, the likelihood calculating section 13, and masked-head-image creating sections 16-U and 16-D and head-edge-image creating sections 17-U and 17-D which are newly provided for human head tracking, are picked out and shown. The pyramidal processing section 11, the in-pyramid position calculating section 12, the true likelihood calculating section 14, the likelihood integrating section 15, and the like which are not shown in this figure may be configured in the same manner as described above with reference to FIGS. 3 and 4, for example.

In the case where the first to fourth measures mentioned above are adopted, in the matching processes corresponding to the three measures from the first to third measures, an image obtained by masking the Ω shape of the head (masked head image) is to be used as image data serving as an observation. In the matching process corresponding to the remaining fourth measure, an image obtained by extracting the edge of the head's Ω shape (head edge image) is to be used as image data serving as an observation.

Accordingly, as shown in FIG. 5, the masked-head-image creating section 16-U and the head-edge-image creating section 17-U are provided in association with an upper-side layer image extracted from the image pyramid 100 formed by the pyramidal processing section 11 (not shown here). Likewise, the masked-head-image creating section 16-D and the head-edge-image creating section 17-D are provided in association with a lower-side layer image.

The masked-head-image creating sections 16U and 16-D each execute image processing including detecting the Ω shape of a head which is present in the image data of an inputted layer image (upper-side layer image or lower-side layer image), and converting the image portion of the detected Ω shape of the head into a masked image (masked head image).

The head-edge-image creating sections 17-U and 17-D each extract the edge of the Ω shape of a head which is present in the image data of an inputted layer image (upper-side layer image or lower-side layer image), and convert the resulting image data into an image in which the Ω shape of the head is represented by the edge (head edge image).

Next, in the likelihood calculating section 13, in accordance with the above-mentioned first to fourth measures that are adopted, the upper-layer-side likelihood calculating section 21 is provided with four matching sections including first to fourth matching sections 31-1 to 31-4. Likewise, the lower-layer-side likelihood calculating section 22 is provided with four matching sections including first to fourth matching sections 32-1 to 32-4.

As described above, for example, a particle filter is applied to each of the eight matching sections (31-1 to 31-4 and 32-1 to 32-4) in the likelihood calculating section 13. The following describes a process using a particle filter which is common to these matching sections.

First, each of the matching sections predicts a large number of combinations of the center position C and scale s of the Ω shape of a head on the basis of FIG. 6. That is, each of the matching sections creates a large number of state predictions based on the combinations of the center position C and scale s of the head's Ω shape. Each of the state predictions is equivalent to a particle. Now, assuming that the center position C of the head's Ω shape is represented by coordinates (u, v), a particle can be represented as a three-dimensional parameter vector in the form:

$$x_i = (u_i, v_i, s_i)^t \quad [\text{Eq. 1}]$$

In (Eq. 1), a variable i indicates a number assigned to a particle, and t indicates the current time.

Figure 7:
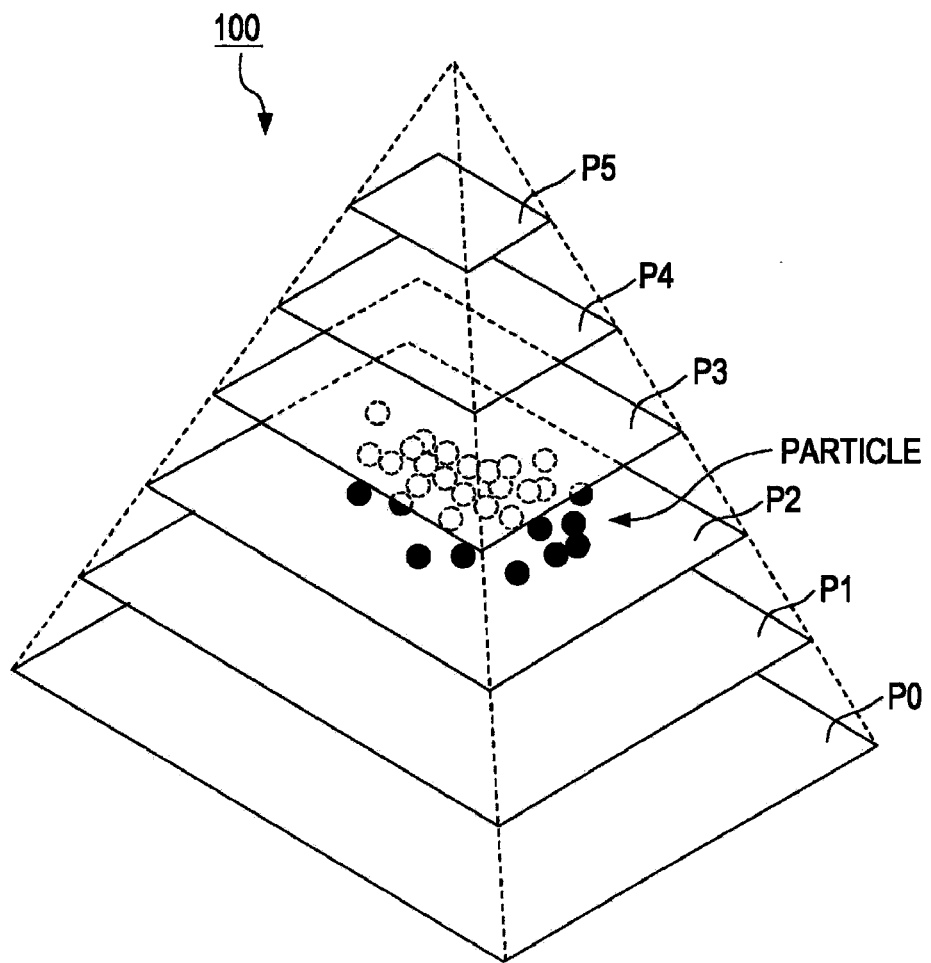
FIG. 7 is a diagram schematically showing the correspondence between particles and an image pyramid.

Particles are as schematically shown in FIG. 7. Each individual particle shown in this figure exists in a spatial position according to a height (equivalent to a scale) within the pyramid corresponding to a prediction given to the particle itself, and the center position C.

Each of the matching sections performs matching between each of these particles against the image data of a layer image as an observation in accordance with the applied measure, and determines a likelihood Wi for each particle i from the result.

On the basis of likelihoods determined for individual particles through processing in each matching section, the maximum likelihood estimate at the current time t can be obtained as a result. This can be determined by, for example, a computation represented by (Eq. 2) below.

$$\bar{x} = \sum_i w_i x_i \quad [\text{Eq. 2}]$$

Next, processing in each matching section is as follows.

First, as processing corresponding to the first measure, the first matching section 31-1 of the upper-layer-side likelihood calculating section 21 receives, as an observation, an input of an upper-side layer image that has been converted into a masked head image. Then, the first matching section 31-1 performs a matching process against each particle on the basis of the Chamfer distance to the contour of the masked head image, thereby determining a likelihood.

Likewise, in accordance with the first measure, the second matching section 32-1 of the lower-layer-side likelihood calculating section 22 also receives, as an observation, an input of a lower-side layer image that has been converted into a masked head image, and performs a matching process against each particle on the basis of the Chamfer distance to the contour of the masked head image to thereby determine a likelihood.

Likewise, each of the second matching section 31-2 of the upper-layer-side likelihood calculating section 21 and the second matching section 32-2 of the lower-layer-side likelihood calculating section 22 receives, as an observation, an input of an upper-side layer image or a lower-side layer image that is a masked head image. Then, in this case, a likelihood is determined by a matching process based on the proportion of masked pixels inside the Ω shape of the head.

Each of the third matching section 31-3 of the upper-layer-side likelihood calculating section 21 and the third matching section 32-3 of the lower-layer-side likelihood calculating section 22 receives, as an observation, an input of an upper-side layer image or a lower-side layer image that is a masked head image, and determines a likelihood by a matching process based on the proportion of masked pixels outside the Ω shape of the head.

Each of the fourth matching section 31-4 of the upper-layer-side likelihood calculating section 21 and the fourth matching section 32-4 of the lower-layer-side likelihood calculating section 22 receives, as an observation, an input of an upper-side layer image or a lower-side layer image that is a masked head image, and determines a likelihood by a matching process based on the Chamfer distance to the edge of the Ω shape of the head.

Although not shown here, in association with the four measures from the first to fourth measures applied, the true likelihood calculating section 14 in this case includes four calculating sections from first to fourth calculating sections 33-1 to 33-4.

The first calculating section 33-1 receives an input of likelihoods from the first matching section 31-1 corresponding to an upper-side layer image and the first matching section 32-1 corresponding to a lower-side layer image, to which the same first measure corresponds, and executes an interpolation process to thereby obtain a true likelihood corresponding to the first measure.

Likewise, the remaining second to fourth calculating sections 33-2 to 33-4 respectively receive inputs of likelihoods from the second to fourth matching sections 31-2 to 31-4 corresponding to upper-side layer images and the second to fourth matching sections 32-2 to 32-4 corresponding to lower-side layer images, to which the first to third measures correspond respectively, and execute interpolation processes. Thus, the second to fourth calculating sections 33-2 to 33-4 can obtain true likelihoods corresponding to the second to fourth measures, respectively.

Now, as a specific example of interpolation process, a computation corresponding to an algorithm using the Chamfer distance as in the case of the first measure or fourth measure is represented as (Eq. 3). For simplicity of description and ease of understanding, (Eq. 3) represents an algorithm for performing an interpolation with respect to the Chamfer distance.

$$d = \frac{\text{scale2}(\text{scale} - \text{scale1})(d1 + d2)}{\text{scale}(\text{scale2} - \text{scale1})} - d2. \quad [\text{Eq. 3}]$$

In (Eq. 3) above, "d" indicates the true Chamfer distance (likelihood) a particle subject to matching is regarded to have. "d1" indicates the Chamfer distance determined by a matching process (the first matching section 31-1 or the fourth matching section 31-4) against an upper-side layer image. "d2" indicates the Chamfer distance determined by a matching process (the first matching section 32-1 or the fourth matching section 32-4) against a lower-side layer image. In addition, "scale" indicates the scale of a target object indicated by a particle subject to matching (equivalent to the scale s in the figure), "scale1" indicates the scale of the target object in the upper-side layer image, and "scale2" indicates the scale of the target object in the lower-side layer image.

A likelihood can be uniquely determined from the Chamfer distance. Therefore, on the basis of (Eq. 3) above, it can be derived that as for a likelihood based on the Chamfer distance as well, a true likelihood can be calculated by an interpolation process.

Various processes are conceivable as the interpolation process for calculating a true likelihood, which is executed by each of the calculating sections in the true likelihood calculating section 14. For example, as the simplest process, linear interpolation is also effective. The above-mentioned example is directed to the case in which two likelihoods are determined on the basis of two layer images that are located directly above and below an in-pyramid position taken as a reference, and an interpolation is performed between these likelihoods. However, another conceivable method is to determine a true likelihood by an interpolation process using three or more likelihoods obtained on the basis of three or more layer images that are selected with reference to an in-pyramid position. In this case, for example, bicubic interpolation or spline interpolation can be adopted.

In a state where dispersion of particles has converged to a certain range through learning in a tracking process, scales indicated by individual particles also converge to a certain range. This means that particles concentrate within a certain height range in the image pyramid 100.

In such a state, an in-pyramid position can be also determined in a stable manner near the height position of each particle. As a result, the levels of an upper-side layer image and a lower-side layer image that are selected on the basis of an in-pyramid position can be identified to a certain extent.

Accordingly, the following configuration is conceivable for the pyramidal processing section 11. That is, in a state where the levels of an upper-side layer image and a lower-side layer image that are selected on the basis of an in-pyramid position can be identified with a certain probability or more, an image pyramid is created in such a way that layer images that can be regarded as having no possibility of being selected are not created. This configuration makes processing lighter since the number of layer images to be created can be reduced.

<4. Configuration Example of Computer Apparatus>

The tracking system according to this embodiment described in the foregoing can be implemented by hardware formed in correspondence with the functional configuration shown in FIGS. 3, 4, 5, and the like. The tracking system can be also implemented by software describing a program for executing processing corresponding to the functional configuration shown in FIGS. 3, 4, 5, and the like. In addition, such hardware and software can be used in combination as well.

To implement at least a part of the processing necessary for dynamic estimation according to this embodiment by software, a program constituting the software is executed by a computer apparatus (CPU) that is a hardware resource as a dynamic estimation system. Alternatively, by causing a computer apparatus such as a general-purpose personal computer to execute the program, a function for executing the processing necessary for dynamic estimation can be given to the computer apparatus.

Figure 8:
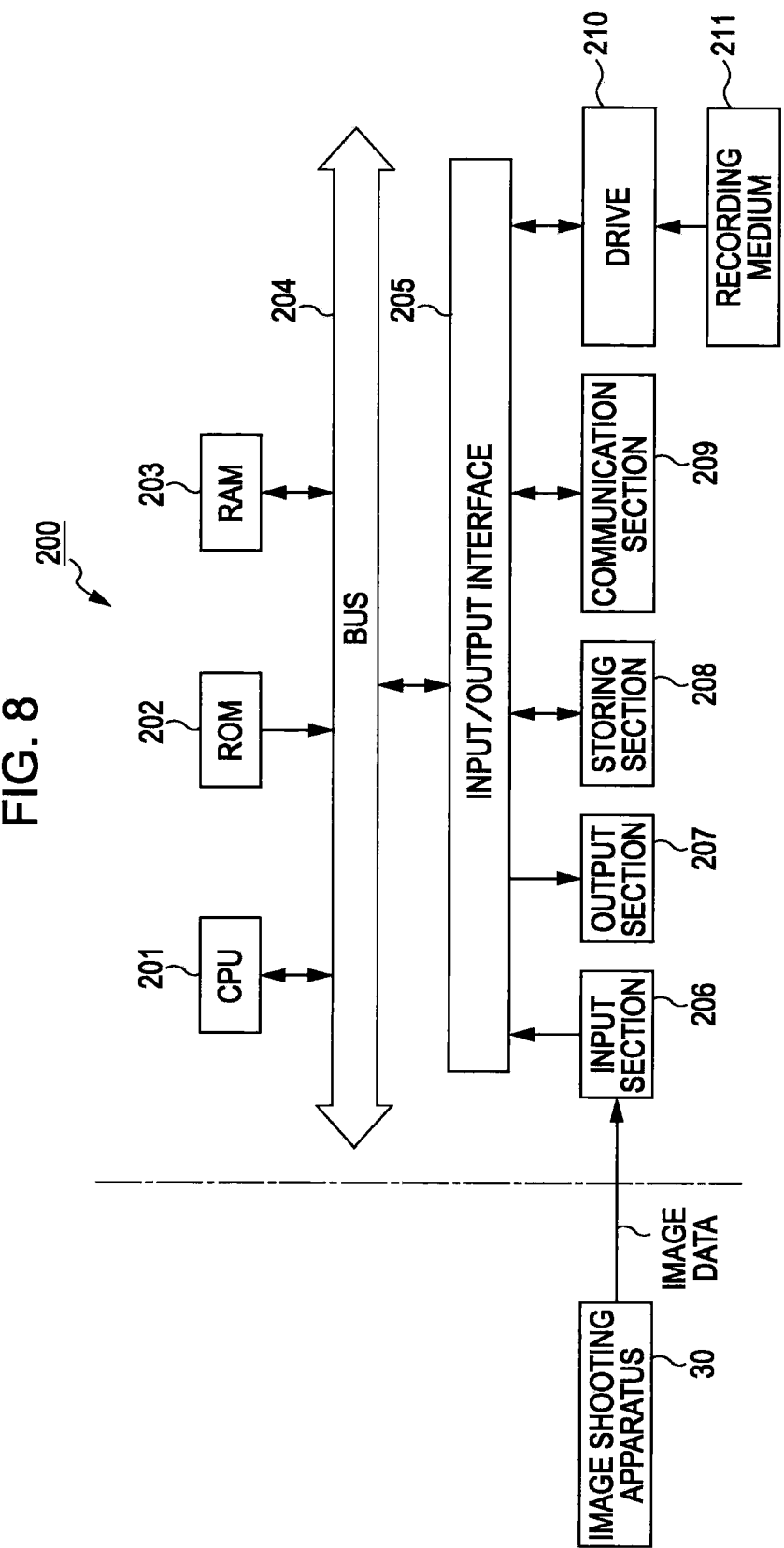
FIG. 8 is a block diagram showing a configuration example of a computer apparatus.

Now, with reference to FIG. 8, a configuration example of a computer apparatus (information processing apparatus) will be described as an apparatus that can execute a program corresponding to a dynamic estimation system according to this embodiment.

In a computer apparatus 200, a CPU (Central Processing Unit) 201, a ROM (Read Only Memory) 202, and a RAM (Random Access Memory) 203 are connected to each other by a bus 204.

The bus 204 is further connected with an input/output interface 205.

The input/output interface 205 is connected with an input section 206, an output section 207, a storing section 208, a communication section 209, and a drive 210.

The input section 206 is made of an operation input device such as a keyboard or a mouse.

In correspondence with the tracking system according to this embodiment, the input section 206 in this case can, for example, receive an input of an image signal (image data) outputted from an image shooting apparatus 30.

The output section 207 is made of a display, a speaker, or the like.

The storing section 208 is made of a hard disk, a non-volatile memory, or the like.

The communication section 209 is made of a network interface or the like.

The drive 210 drives a recording medium 211 such as a magnetic disk, an optical disc, a magneto-optical disc, or a semiconductor memory.

In the computer apparatus 200 configured as described above, for example, the CPU 201 executes a program recorded in the storing section 208 by loading the program into the RAM 203 via the input/output interface 205 and the bus 204, thereby performing the above-described series of processes.

The program executed by the CPU 201 is provided by, for example, being recorded on the recording medium 211 in the form of packaged media made of a magnetic disk (including a flexible disk), an optical disc (such as a CD-ROM (Compact Disc-Read Only Memory) or a DVD (Digital Versatile Disc)), a magneto-optical disc, a semiconductor memory, or the like, or via a wired or wireless transmission medium, such as a local area network, the Internet, or digital satellite broadcast.

Then, the program can be installed into the storing section 208 via the input/output interface 205, by mounting the recording medium 211 in the drive 210. Also, the program can be received by the communication section 209 via a wired or wireless transmission medium, and installed into the storing section 208. Alternatively, the program can be installed into the ROM 202 or the storing section 208 in advance.

The program executed by the computer apparatus 200 may be a program in which processes are performed in time series in the order described in this specification, or may be a program in which processes are performed in parallel or at necessary timing, such as when invoked.

While the foregoing description of the embodiment is based on the assumption that the present invention is adapted to tracking of a target object to be processed, image processing based on an embodiment of the present invention can be applied not only to tracking but also other various kinds of image processing.

The present application contains subject matter related to that disclosed in Japanese Priority Patent Application JP 2008-285531 filed in the Japan Patent Office on Nov. 6, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising: image pyramid forming means for forming an image pyramid by creating layered image data including images at different scales in a hierarchical arrangement from inputted image data;
   position calculating means for determining an in-image-pyramid position that is a height position in the image pyramid to which template image data corresponds, the template image data having an image portion of a target object at a fixed scale;
   upper-layer-side likelihood calculating means for determining a likelihood with respect to a target object by matching between upper-side layer image data that exists directly above the in-image-pyramid position, and a state prediction;
   lower-layer-side likelihood calculating means for determining a likelihood with respect to a target object by matching between lower-side layer image data that exists directly below the in-image-pyramid position, and a state prediction; and
   true likelihood calculating means for determining a true likelihood from the likelihoods determined by the upper-layer-side likelihood calculating means and the lower-layer-side likelihood calculating means.

2. The image processing apparatus according to claim 1, wherein:
   the upper-layer-side likelihood calculating means and the lower-layer-side likelihood calculating means each perform matching using first to N (N is a natural number) matching measures to determine first to N likelihoods in correspondence with the first to N-th matching measures, respectively; and
   the true likelihood calculating means determines first to N-th true likelihoods in correspondence with two sets of the first to N-th likelihoods determined by the upper-layer-side likelihood calculating means and the lower-layer-side likelihood calculating means, respectively.

3. The image processing apparatus according to claim 1 or 2, further comprising image converting means for performing image processing that converts the layered image data into image data used for matching which is adapted to a specific matching measure of the first to N-th matching measures,
   wherein the upper-layer-side likelihood calculating means and the lower-layer-side likelihood calculating means use an upper-side layer image and a lower-side layer image converted into the image data used for matching, respectively, when performing matching based on the specific matching measure of the first to N-th matching measures.

4. An image processing method comprising the steps of:
forming an image pyramid by creating layered image data including images at different scales in a hierarchical arrangement from inputted image data;
   determining an in-image-pyramid position that is a height position in the image pyramid to which template image data corresponds, the template image data having an image portion of a target object at a fixed scale;
   determining an upper-layer-side likelihood with respect to a target object by matching between upper-side layer image data that exists directly above the in-image-pyramid position, and a state prediction;
   determining a lower-layer-side likelihood with respect to a target object by matching between lower-side layer image data that exists directly below the in-image-pyramid position, and a state prediction; and
   determining a true likelihood from the upper-layer-side likelihood and the lower-layer-side likelihood.

5. A non-transitory computer-readable recording medium storing a program for causing an image processing apparatus to execute the steps of:
   forming an image pyramid by creating layered image data including images at different scales in a hierarchical arrangement from inputted image data;
   determining an in-image-pyramid position that is a height position in the image pyramid to which template image data corresponds, the template image data having an image portion of a target object at a fixed scale;

determining an upper-layer-side likelihood with respect to a target object by matching between upper-side layer image data that exists directly above the in-image-pyramid position, and a state prediction; determining a lower-layer-side likelihood with respect to a target object by matching between lower-side layer image data that exists directly below the in-image-pyramid position, and a state prediction; and determining a true likelihood from the upper-layer-side likelihood and the lower-layer-side likelihood.

6. An image processing apparatus comprising:

a processor that executes;

an image pyramid forming section configured to form an image pyramid by creating layered image data including images at different scales in a hierarchical arrangement from inputted image data;

a position calculating section configured to determine an in-image-pyramid position that is a height position in the image pyramid to which template image data corresponds, the template image data having an image portion of a target object at a fixed scale;

an upper-layer-side likelihood calculating section configured to determine a likelihood with respect to a target object by matching between upper-side layer image data that exists directly above the in-image-pyramid position, and a state prediction;

a lower-layer-side likelihood calculating section configured to determine a likelihood with respect to a target object by matching between lower-side layer image data that exists directly below the in-image-pyramid position, and a state prediction; and a true likelihood calculating section configured to determine a true likelihood from the likelihoods determined by the upper-layer-side likelihood calculating section and the lower-layer-side likelihood calculating section.

* * * * *